April 13, 1965

A. WÖRNER ETAL 3,177,562

METHOD OF PRODUCING COMMUTATORS

Filed Jan. 4, 1961

INVENTOR
Anton Wörner
Heinz Gerlach

BY Ernest J. Montague

ATTORNEY

United States Patent Office 3,177,562
Patented Apr. 13, 1965

3,177,562
METHOD OF PRODUCING COMMUTATORS
Anton Wörner, Stuttgart, and Heinz Gerlach, Ehningen, Germany, assignors to Kautt & Bux, Stuttgart-Vaihingen, Germany, a firm
Filed Jan. 4, 1961, Ser. No. 80,607
Claims priority, application Germany, Jan. 16, 1960,
K 39,680
4 Claims. (Cl. 29—155.54)

The present invention relates to a method of producing commutators, in which each commutator is produced from a tubular part which is divided by slots of a length in accordance with the length of the commutator so as to form segments which are held together at one end by an annular extension and in which the material of each tubular part is also machined so as to form securing elements for each segment.

It is an object of the present invention to provide a method of producing commutators including the securing elements of the individual segments thereof at the least possible waste of material, and of securing these elements to the segments without reducing or weakening the walls thereof.

It is another object of the present invention to provide a method of producing commutators, wherein a tubular part is upset and split so as to provide this part with at least one internal flange or the like which, when the tubular part is thereafter cut apart to form the individual segments, forms a securing element which is integrally connected to each segment. The upsetting operation has the advantage that the material of the tubular part and thus also the wall of this part and the wall of each segment will be considerably solidified, while by splitting the wall of the tube at least at one end to form the securing part, the remainder of the wall will not be weakened. Since this securing part is formed by splitting an extension of the tube and by bending inwardly the inner ring of the split wall, while the outer ring is subsequently cut off, the individual segments will not be weakened at all by the provision of these securing parts. Since only this short and thin ring is cut off, the loss of material incurred in producing the segments—aside from the longitudinal cuts in the tube separating the segments from each other—is very small. Furthermore, since the upsetting and splitting operations according to the present invention are carried out before these longitudinal cuts are made, the securing parts will have the full width of the segments and are therefore very strong.

With these and other objects in view, which will become apparent in the following detailed description, the present invention will be clearly understod in connection with the accompanying drawings, in which.

Figure 1:
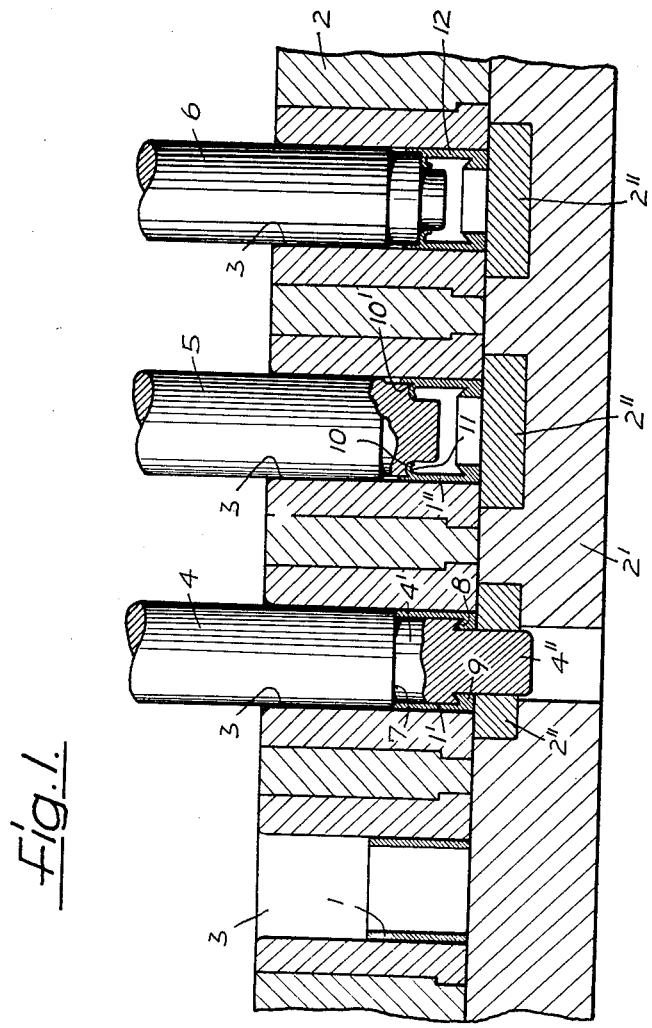
FIG. 1 is a section of a follow-on tool used in the method according to the present invention, which section is taken along a cylindrical surface through the centers of the socketlike inserts of a turntable in which the tubular parts are successively machined before they are divided into segments.

Referring now to the drawings, FIG. 1 illustrates a follow-on tool in which the tubular parts 1 are machined before they are cut apart into segments by a suitable sawing apparatus. The follow-on tool consists of a turntable 2 which is rotated intermittently and has at least four socketlike inserts 3 uniformly distributed along its peripheral edge into which the tubular parts 1 are inserted, which are to be machined by upsetting and splitting tools 4, 5, and 6. The turntable 2 is rotatably mounted on a stationary base plate 2' which closes off some of the sockets 3 in the turntable 2 in downward direction in accordance with the respective tools. Those parts of the base plate 2' which will be subjected to a higher pressure are provided with inserts 2" of hard metal.

In the operation of the follow-on tool, as illustrated in FIG. 1, a tubular part 1 which is cut to a certain length but is otherwise entirely unmachined is inserted into a socket 3 when the same is in the stopped position, as shown at the extreme left of the drawing. When the turntable 2 is then turned to the next stop, that is, toward the right in FIG. 1, this socket 3 is placed directly underneath the ramlike upsetting tool 4. This tool 4 is reduced twice at its lower end to form two cylindrical portions 4' and 4" and shoulders 7 and 8. The full diameter of the tool 4 substantially corresponds to the inner diameter of socket 3, while the diameter of portion 4' is smaller by substantially twice the wall thickness of tube 1, so that, when the tool 4 enters into the socket 3, an annular cylindrical gap is formed between the portion 4' and the wall of the socket 3, which is filled out by the tubular part 1. The distance between the two shoulders 7 and 8 is slightly smaller than the length of the tubular part 1 after the upsetting operation has been carried out, so that again an annular gap is formed between the inner wall of the tube 1 and the outer wall of the portion 4". When the tool 4 moves downwardly, the flat annular shoulder 7 presses upon the upper edge of the tube 1, so that the material thereof will be upset and forced into the annular gap around part 4". Since the annular shoulder 8 is conically relieved, the upset part 9 of the tube 1, which in this stage of the operation is marked with the numeral 1' will form therein an inwardly projecting shoulder portion or flange of a dovetailed shape. By this upsetting operation, the material of the tube 1 will be considerably solidified. As soon as the upsetting operation has been completed, the tool 4 is withdrawn from the socket 3, and the turntable 2 then carries out another turn to the next stop, in which the upset tubular part 1' will be placed directly underneath the splitting tool 5. This splitting tool 5 is similar to the upsetting tool 4, except that the second shoulder 10 at the lower end of the tool 5 forms a cutting edge 10' which is adapted to cut for a certain distance downwardly into the upper edge of the tube, which in this stage of the operation is marked 1", and to bend the inner cut portion inwardly and downwardly to form an annular claw-shaped flange 11.

After this operation, the tool 5 is withdrawn and the turntable 2 is turned to the next stop, in which the tube 1" is placed underneath a tool 6 which finishes the tubular part by flattening the upper side of the claw-shaped flange 11 whereby the latter is also bent further downwardly.

Figure 2:
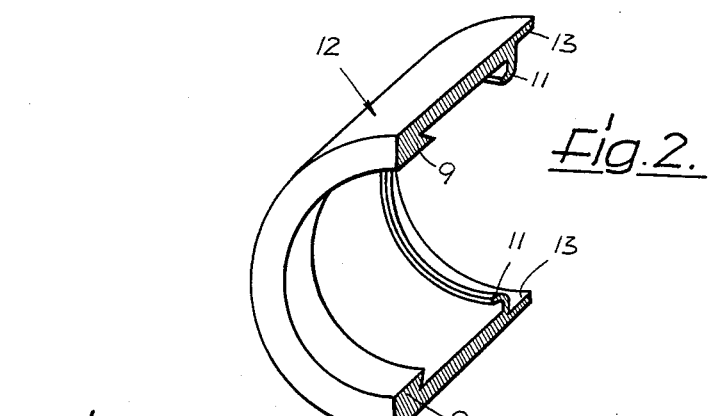
FIG. 2 is a perspective view of one-half of a tubular part for producing the commutator segments and after it has been machined in the turntable according to FIG. 1.

One-half of the finished tubular part 12 is illustrated perspectively in FIG. 2, which shows at the front end of the tube 12 the inner upset part 9 and near the rear end the annular claw-shaped flange 11. After the tube 12 has been cut into segments by diametrically extending cuts, these two projecting parts 9 and 11 form securing members for locking the segments within the insulating material of the commutator. In order to facilitate the installation of the segments, it is advisable, when cutting apart the tube 12, not to cut entirely through the rear end portion 13 of its wall which remains after the splitting operation, so that this annular end portion 13 will hold together the otherwise separated segments until the commutator is completed at which time this portion is cut off to the level of the flattened side of the claw-shaped part 11, whereby the individual segments will be separated from each other.

Figure 3:
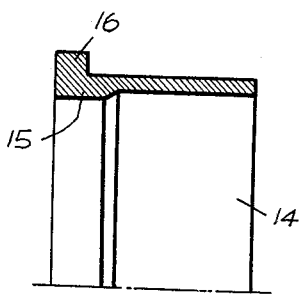
FIG. 3 is a quarter section of a tubular part which has been machined in the first stage of operation of a follow-on tool according to a modification of the present invention as shown in FIG. 1.

The tubular part 14, as illustrated in FIG. 3, is formed in the stage of operation corresponding to that in which the tubular part 1' in FIG. 1 is formed. Each socket 3 of turntable 2 is, however, in this case provided at its lower end with an annular recess, while the shoulder portion 8 is not conically relieved, as shown in FIG. 1, but forms an obtuse angle to the cylindrical surfaces of the portions 4' and 4". Thus, when the tube 1' has been upset, it will be provided with an inner projection 15 and with an outer flange 16, as shown in FIG. 3, in accordance with the annular recess in socket 3.

Figure 4:
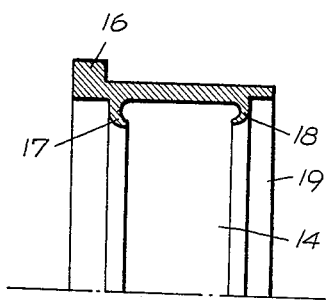
FIG. 4 is a view similar to FIG. 3 of a tubular part after being removed from the modified follow-on tool.

FIG. 4 illustrates the two further production stages following the stage according to FIG. 3. In this case, both ends of the tubular part 14 are split apart so as to form opposite inner flanges 17 and 18. Flange 17 is produced by splitting the upset material of the inner projection 15. The annular end portion 19 corresponding to the end portion 13 in FIG. 2 which remains from the splitting operation when forming flange 18 is also in this case left substantially uncut when the tube 14 is divided into segments by diametrical cuts so as to hold these segments together.

Aside from these diametrical cuts which extend at least up to end portion 19, additional cuts 20 are provided in the outer flange 16 so as to form soldering slots. These slots may be made either during the final stage of the production of the tubular part 14 or after the entire commutator has been completed in the usual manner.

Figure 5:
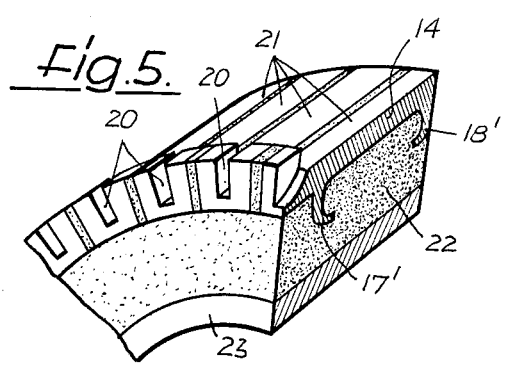
FIG. 5 is a perspective view of a portion of a commutator, as illustrated in a diametrical section, the individual segments of which are produced by cutting apart the tubular part as shown in FIGURE 4 in the longitudinal direction thereof.

We claim:

As illustrated in FIG. 5, the segments 21, preferably while still being interconnected by the wall portion 13, are finally completely embedded in an insulating compound 22, which may also separate and insulate the individual segments from each other, and the inner wall of which may be reinforced in the conventional manner by a bushing 23. When thus embedded, the individual segments 21 will be securely held in the insulating compound 22 by the claw-shaped flanges 17 and 18.

Since by the upsetting operation as carried out according to the embodiment shown in FIGS. 1 and 2, the wall portion 9 of the individual segments also has a sufficient body, the soldering slots 20 may also be provided therein.

While we have disclosed several embodiments of the present invention, it is to be understood that these embodiments are given by example only and not in a limiting sense, the scope of the present invention being determined by the objects and the claims.

We claim:

1. A method of producing commutators comprising the steps of
upsetting the material of one end of a tubular part having a length exceeding the final length of the commutator, in order to form a first inner flange on said end of said tubular part,
splitting of the other end of said subular part in axial direction for a length within said exceeding length of said tubular part and concentrically to the outer and inner surfaces of said tubular part, to form an inner and an outer portion of said other end of said tubular part,
bending inwardly said inner portion of said other end of said tubular part to form a second inner flange,
cutting longitudinal slots into said tubular part short of said outer portion of said tubular part, in order to divide the latter including said first and second flanges into a plurality of segments and to retain at first said segments in position by means of said still integral exceeding length of said tubular part,
inserting insulating compound inside of and into said longitudinal slots in order to insulate said segments from each other and to embed said segments in said insulating compound, and
cutting off said still integral outer portion of said tubular part and, thereby, separating now completely said segments from each other.

2. The method, as set forth in claim 1, which includes the steps of
upsetting the material of the other end of said tubular part simultaneously with said upsetting step of said one end of said tubular part, and
subsequently cutting soldering slots into said first inner flange of each of said segments.

3. The method, as set forth in claim 1, which includes the steps of
splitting said first inner flange on said end of said tubular part to form an inner portion and an outer portion of said first inner flange, and
bending inwardly said inner part of said first inner flange.

4. The method, as set forth in claim 3, which includes the step of
pressing the end face of said bent inner portion of said other end of said tubular part and the end face of said inner portion of said first inner flange into parallel planes disposed perpendicularly to the longitudinal axis of said commutator.

References Cited by the Examiner

UNITED STATES PATENTS

| | | | |
|---|---|---|---|
| 435,504 | 9/90 | Lieb | 29—155.54 |
| 1,578,793 | 3/26 | Apple | 29—155.54 |
| 1,633,922 | 6/27 | Carter | 29—155.54 |
| 1,693,997 | 12/28 | Carter | 29—155.54 |
| 2,188,423 | 1/40 | Andrews | 29—155.54 |
| 2,283,808 | 5/42 | Humphrey | 310—235 |
| 2,400,590 | 5/46 | Meyerhoefer | 29—155.54 |
| 2,451,500 | 10/48 | Le Greid | 29—155.54 |
| 2,533,775 | 12/50 | Durrschimdt | 310—235 |
| 2,963,774 | 12/60 | Pike | 29—155.54 |
| 3,010,182 | 11/61 | Quinlan | 29—155.54 |

JOHN F. CAMPBELL, *Primary Examiner.*

MILTON O. HIRSHFIELD, *Examiner.*